(12) United States Patent
Rowe et al.

(10) Patent No.: US 7,155,193 B2
(45) Date of Patent: Dec. 26, 2006

(54) MULTI-CHANNEL FILTERING SYSTEM FOR TRANSCEIVER ARCHITECTURES

(75) Inventors: David A. Rowe, Torrance, CA (US); Craig A. Hornbuckle, Torrance, CA (US); Matthew D Pope, Rancho Palos Verdes, CA (US)

(73) Assignee: Sierra Monolithics, Inc., Redondo Beach, CA (US)

( * ) Notice: Subject to any disclaimer, the term of this patent is extended or adjusted under 35 U.S.C. 154(b) by 444 days.

(21) Appl. No.: 10/806,682

(22) Filed: Mar. 22, 2004

(65) Prior Publication Data

US 2005/0208918 A1    Sep. 22, 2005

(51) Int. Cl.
*H04B 1/38* (2006.01)

(52) U.S. Cl. .................. 455/296; 455/114.2; 455/266; 455/295; 455/306; 455/307

(58) Field of Classification Search ............. 455/114.2, 455/296, 63.1, 63.3, 67.13, 68, 78, 83, 550.1, 455/560, 91, 115.1, 168.1, 170.1, 191.3, 213, 455/293, 299, 306, 307, 339, 553.1, 266, 455/278.1; 379/416–417; 375/316; 370/343
See application file for complete search history.

(56) References Cited

U.S. PATENT DOCUMENTS

| | | | | |
|---|---|---|---|---|
| 5,339,455 A | * | 8/1994 | Vogt et al. | 455/266 |
| 5,493,717 A | * | 2/1996 | Schwarz | 455/306 |
| 5,742,215 A | * | 4/1998 | Park | 333/204 |
| 5,758,296 A | * | 5/1998 | Nakamura | 455/575.7 |
| 6,047,171 A | | 4/2000 | Khayrallah et al. | |
| 6,252,633 B1 | | 6/2001 | Ruitenburg | |
| 6,414,570 B1 | * | 7/2002 | Dalconzo et al. | 333/202 |
| 6,501,944 B1 | * | 12/2002 | Szydlowski et al. | 455/266 |
| 6,553,229 B1 | | 4/2003 | Dent | |
| 6,571,081 B1 | | 5/2003 | Reinhardt | |
| 6,584,304 B1 | * | 6/2003 | Thomsen et al. | 455/188.1 |
| 6,662,018 B1 | | 12/2003 | Kintis et al. | |
| 6,985,709 B1 | * | 1/2006 | Perets | 455/266 |
| 2002/0123306 A1 | | 9/2002 | Masoian | |
| 2004/0266379 A1 | | 12/2004 | Woo et al. | |

OTHER PUBLICATIONS

R. Eline, "Radio Architecture Methods for IEEE 802.16a OFDM Radio Transceiver," Jul. 3, 2003.

* cited by examiner

*Primary Examiner*—Pablo N. Tran
(74) *Attorney, Agent, or Firm*—McDermott Will & Emery LLP

(57) ABSTRACT

A multi-channel filtering system for use with a transceiver includes a front-end multi-pole, multi-throw switch, a back-end multi-pole, multi-throw switch, and a plurality of filters. The front-end switch includes a receive pole, a transmit pole, and a plurality of switch throws. The back-end switch also includes a receive pole, a transmit pole, and a plurality of switch throws. Each of the plurality of filters has first and second ports, each first port coupled to one of the switch throws of the front-end switch, and each second port coupled to one of the switch throws of the back-end switch. Using this configuration, filters of differing bandwidths can be switched in during signal reception and/or transmission, thereby tailoring the communication rate to the particular conditions.

20 Claims, 2 Drawing Sheets

MULTI-CHANNEL FILTERING SYSTEM FOR TRANSCEIVER ARCHITECTURES

BACKGROUND

The present invention relates generally to communication systems, and more specifically to multi-channel filtering systems and transceiver architectures having variable transmission and reception bandwidths.

Present day communication systems are often limited in their reliability and speed by adjacent channel interference. Adjacent channel interference, or "spectral crowding" as it is referred to in wireless communication systems, occurs when one or more received signals occur adjacent to the intended signal, the adjacent signal's proximity and/or signal strength relative to the intended signal being such that the destination receiver is critically limited or unable to process the intended signal accurately. The problem often results in poor quality or dropped connections when a large number of users attempt to use the particular system's available bandwidth, as each user provides a potentially interfering signal to the other's intended signal. In addition, the interference tends to be intermittent; for example, the communication system may be more heavily used during one period of time as opposed to others, or the source of the interference itself may be temporary, e.g., a mobile telephone user who is allocated to an adjacent channel in an otherwise uncrowded spectrum.

FIG. 1 illustrates a conventional transceiver 100 used in establishing a wireless communication network link in which the transmitter and receiver functions are not operated concurrently. The conventional transceiver 100 consists of a transceiver front-end 120, a filter 134 connected between two 2-pole, single throw switches 132 and 136, and a transceiver back-end 140. Each of the 2-pole, single throw switches have a receive pole and a transmit pole. During a receive operation, both switches connect to their receive poles, thereby completing the receive channel through filter 134. Similarly during signal transmission, both switches connect to their transmit poles to complete the transmit channel through the filter 134. Using this transceiver topology, filter 134 may be used in both transmit and receive modes of operation.

The conventional transceiver 100 does not provide a solution to the adjacent channel interference problem, as it employs a single filter 134 which may be too wide in some circumstances, and too narrow in others. For example, when the conventional transceiver 100 is operated in an environment or during a time when there are many adjacent channel users, the filter 136 may be too wide, and not provide the requisite amount of adjacent channel rejection during reception. During other times when adjacent bands are relatively free, the filter 136 may be too narrow, limiting the communication rate unnecessarily.

What is needed is an improved transceiver architecture which is adaptable to limit the transceiver's bandwidth when adjacent signal interference is present, and to widen the transceiver's bandwidth to increase the communication rate when conditions permit.

SUMMARY OF THE INVENTION

The present invention provides a multi-channel filtering system and transceiver architecture which allows for a variable transmission and reception bandwidth. The variable transmission and reception rates enable the transceiver to combat adjacent channel interference when present, and to maximize the communication bandwidth when the spectrum is relatively free of adjacent channel interference.

In one embodiment of the invention, a multi-channel filtering system for use in a transceiver is presented. The multi-channel filtering system includes a front-end multi-pole, multi-throw switch, a back-end multi-pole, multi-throw switch, and a plurality of filters coupled therebetween. The front-end switch includes a receive pole, a transmit pole, and a plurality of switch throws. The back-end switch also includes a receive pole, a transmit pole, and a plurality of switch throws. Each of the plurality of filters has first and second ports, each first port coupled to one of the switch throws of the front-end switch, and each second port coupled to one of the switch throws of the back-end switch. Using this configuration, filters of differing bandwidths can be switched in during signal reception and/or transmission, thereby tailoring the communication rate to the particular interference and data transmission rate conditions.

In one embodiment of the invention, a multi-channel system for use with at least one of a receive channel and a transmit channel comprises: a front-end multi-throw switch, comprising: a plurality of front-end throws; and at least one front-end pole configured to couple to one of a receive channel and a transmit channel at a first location, the at least one front-end pole switchably coupled to one of the plurality of front-end throws; a back-end multi-throw switch, comprising: a plurality of back-end throws; and at least one back-end pole configured to couple to the one of the receive channel and the transmit channel at a second location, the at least one back-end pole switchably coupled to one of the plurality of back-end throws; and a plurality of filters interposed between the front-end multi-throw switch and the back-end multi-throw switch, each of the plurality of filters having a first port coupled to one of the plurality of front-end throws and a second port coupled to one of the plurality of back-end throws.

These and other features of the invention will be better understood when viewed in light of the following drawings and detailed description.

Figure 1:
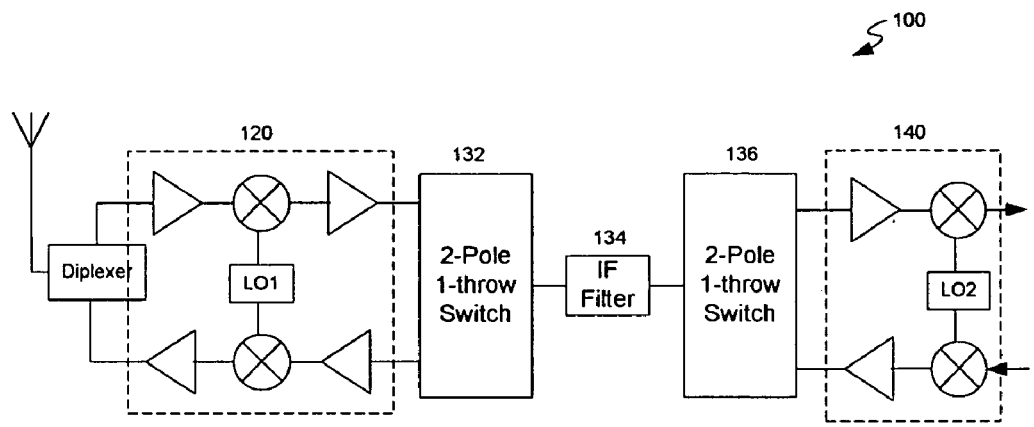
FIG. 1 illustrates a conventional transceiver known in the art.

For clarity and convenience, features and components in earlier drawings retain their reference numerals in subsequent drawings.

DETAILED DESCRIPTION OF THE INVENTION

Figure 2:
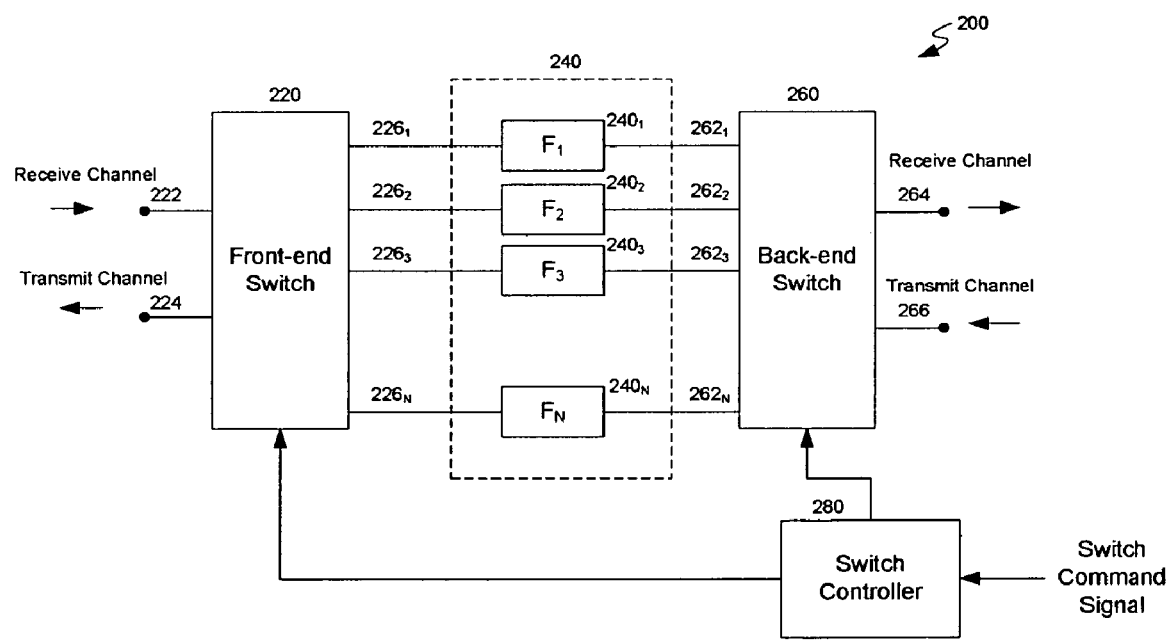
FIG. 2 illustrates a multi-channel filtering system in accordance with one embodiment of the present invention.

FIG. 2 illustrates a multi-channel filtering system in accordance with one embodiment of the present invention. The multi-channel filtering system 200 includes a front-end multi-pole, multi-throw switch 220 ("front-end switch" hereafter), filters $F_{1-N}$ 240, a back-end multi-pole, multi-throw switch 260 ("back-end switch" hereafter), and a switch controller 280. The multi-channel filtering system 200 is designed to intersect the transceiver's transmit and receive channels, thereby providing a range of available transmit and receive bandwidths, as described in greater detail below.

In the exemplary embodiment shown, the front-end switch 220 comprises two poles: a receive pole 222, and a transmit pole 224. The receive pole 222 is configured for coupling to front-end receiver circuitry and components, which may include frequency conversion stages, low noise or buffer amplifiers, limiter and similar components used in the receive channel. The transmit pole 224 is configured for coupling to front-end transmitter circuitry and components, which may include frequency conversion stages, a power amplifier, amplifier linearizer and the like. The front-end switch 220 additionally includes multiple switch throws $226_{1-N}$ to which either of the receive pole 222 or the transmit pole 224 is switchably coupled.

The multi-channel filtering system 200 further includes filters $240_{1-N}$, and a back-end switch 260. Each of the filters $240_{1-N}$ includes a first port coupled to one of the front-end switch throws $226_{1-N}$, and a second port coupled to one of the back-end switch throws $262_{1-N}$. The back-end switch 260 further includes a receive channel pole 264 configured to couple to the receiver back-end circuitry and components such as IF and baseband electronics (e.g., analog-to-digital converters, analog or digital demodulation stages, etc.), and a transmit pole 266 configured to coupled to the transmitter back-end circuitry and components (e.g., digital to analog converters, analog or digital modulation stages, etc.).

In a particular embodiment, filters $F_1$–$F_N$ comprise filters of differing bandwidths to enable a selection between a narrower channel bandwidth, and accordingly greater adjacent channel noise rejection, or a wider channel bandwidth, and a corresponding faster communication data rate. Further, a particular filter may be selected during signal transmission, and a different filter selected during signal reception. The filters may comprise any particular filter type (e.g., lowpass, bandpass, highpass, bandstop, notch, etc.), and in an exemplary embodiment comprise bandpass filters. Further, the filters 240 may be located external to, or integrated with, the front and back-end switch 220 and 260. For example, in one embodiment the front and back-end switches 220 and 260 and filters 240 are integrally formed in a monolithic integrated circuit. In another embodiment, front and back-end switches 220 and 260 are implemented as integrated circuits, and filters 240 comprise discrete filters, such as surface acoustic wave (SAW) filters. These configurations are only exemplary, and those skilled in the art will appreciate that the present invention may be employed in alternative implementations under the present invention as well.

Responsive to a switch command signal, switch controller 280 is operable to synchronously control the states of front and back-end switches 220 and 260 such that their respective throws are coupled to the same filter, thereby completing either the receive channel between the first and second switch receive poles 222 and 264, or the transmit channel between first and second switch transmit poles 224 and 266. The switch controller comprises a circuit configured to perform the aforementioned operations, and may be realized in analog or digital form, or a combination thereof. Further, the switch command signal may comprise an analog or digitally formatted signal. In a particular embodiment, the switch command signal is a digitally formatted signal, and the switch controller is integrally formed with the front and back-end switches 220 and 260 using a photolithographic semiconductor processing technique.

Figure 3:
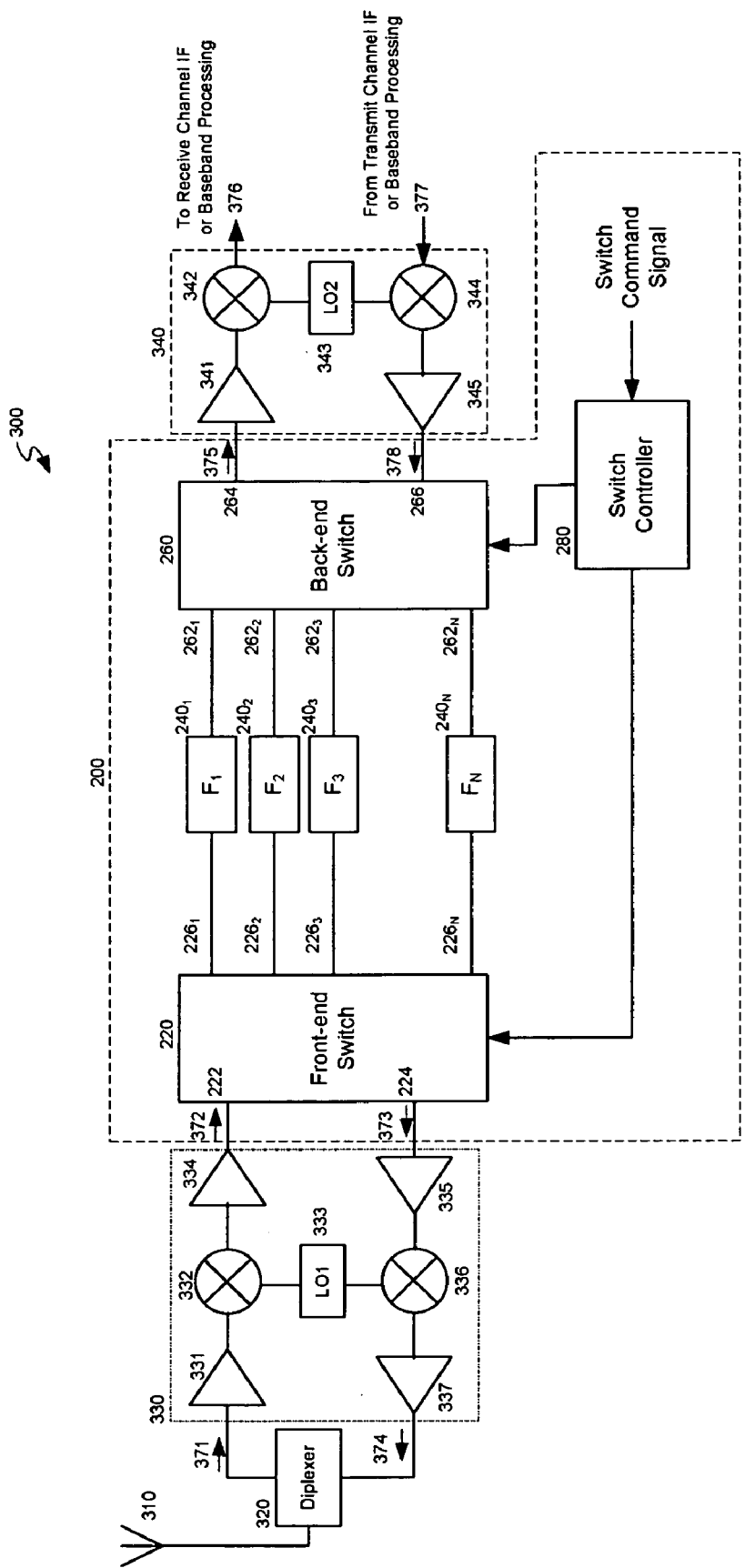
FIG. 3 illustrates a transceiver implementing the multi-channel filtering system in accordance with one embodiment of the present invention.

FIG. 3 illustrates an improved transceiver implementing the multi-channel filtering system in accordance with one embodiment of the present invention, with previously identified features retaining their reference numerals. The improved transceiver 300 includes an antenna 310, a diplexer 320, a transceiver front-end 330, a transceiver back-end 340, and the previously described multi-channel filtering system 200. The antenna 310 provides for the efficient transmission and reception of the desired signal, and may be of any particular type or construction (e.g., directional, omni directional, waveguide, dipole, helix, circular, elliptical or linear polarized, etc.). Diplexer 320 isolates the receive and transmit channels from each other, and allows the sharing of the antenna 310. In an alternative embodiment under the present invention, separate transmit and receive antennas are used. In such an embodiment, the diplexer is not required and may be omitted.

The transceiver front-end 330 includes receive channel components 331–334 which are operable to condition the received signal 371 to the frequency and magnitude desired before processing by the multi-channel filtering system 200. In an exemplary embodiment shown, the receiver channel components include a low noise amplifier 331, a mixer 332, a shared front-end frequency source 333, and a buffer amplifier 334. The low noise amplifier 331 is operable to amplify the received signal with a minimum of additional noise (typically less than 1.5 dB). The amplified signal and a reference signal from the frequency source 333 are supplied to the mixer 332, which produces in response a frequency translated version of the received signal. The front-end source 333 may be a fixed or a variable frequency source, as known in the art. A buffer amplifier 334 provides additional amplification as well as an improved impedance matching and isolation at the multi-channel filtering system interface. The frequency converted receive signal 372 is supplied to the front-end receive pole for filtering. The term "mixer" as used herein is a functional description, and the actual implementation may comprise a single, balanced, doubly balanced mixer, or other frequency converter circuits such as image rejection (or single sideband) mixers known in the art. Further, the frequency translation may be either an upconversion or a downconversion (including zero IF downconversions), depending upon the desired frequency input to the multi-channel filtering system, image rejection requirements, and other transceiver operational requirements.

The transceiver front end 330 further comprises transmit channel components including a buffer amplifier 335, mixer 336, and a power amplifier 337. In a particular embodiment, the front-end source 333 is shared between the receive and transmit channels for component reduction and cost savings. Alternatively, a separate frequency source can be used to supply the reference signal to mixer 336. The buffer amplifier 335 provides impedance-matching and enhanced isolation at the interface of the multichannel filtering system. Mixer 336 and reference source 333 operate to frequency translate the transmit signal 373 to a carrier frequency. Power amplifier 337 amplifies the magnitude of the carrier frequency signal to the transmission power, and the resulting carrier signal 374 is produced. The power amplifier 337 may comprise linearization or predistortion circuitry, as known in the art.

The transceiver back-end 340 includes receive channel components 341–343 and transmit channel components 344 and 345. The receive channel components include a buffer amplifier 341 operable to provide impedance matching and improved isolation between the multi-channel filtering system and subsequent IF or baseband frequency components.

Mixer 342 and reference signal output from a second frequency source 343 are operable to frequency translate (up or down) the filtered received signal 375 to a frequency translated signal 376 in the intermediate frequency (IF) or baseband (BB) frequency range. Subsequent IF or BB frequency components may include additional filtering, analog-to-digital converters, demodulation, multiplexing, demultiplexing, and the like.

Transceiver back-end transmit channel components include a mixer 344 and buffer amplifier 345, with the transmit channel components sharing the use of the second frequency source 343. A separate frequency source may be used in an alternative embodiment of the present invention. Mixer 344 receives the IF/BB transmit signal 377 and a second reference signal supplied by the frequency source 343, producing in response, a frequency translated version of the IF/BB transmit signal. Buffer amplifier 345 amplifies the produced signal, and additional provides impedance matching and isolation enhancement.

APPLICATIONS AND SPECIFIC EMBODIMENTS

The systems of the present invention can be used in any application where varying filtering requirements are needed. The need for this capability is especially critical in wireless communication applications that are prone to spectral crowding. For example, mobile telephone users who live in areas covered by two or more service providers are likely to encounter problems, as the frequency band allocated to a telephone call may be very close to those bands allocated to the competitor's service. Also, short and medium range wireless networks such as "WiFi" (IEEE 802.11b), "WiFi-G" (IEEE 802.11g) and "MLAN" (802.16a) are prone to network congestion or failure if an excessive number of users attempt to access the network or allocated too much of the network's bandwidth. In these and similar applications, a transceiver using the multi-channel filtering system could be used to vary the receiver and/or transmit channel bandwidth to improve the reliability and speed of the connection. When the network is crowded with adjacent channel users, a link's transmitter and receiver may be configured to synchronously switch in narrow-band filters to increase adjacent band rejection, thereby improving the link's reliability. When network use is light, the link's transmitter and receiver operate to synchronously switch in wider filters to increase the transfer rate. Those skilled in the art will appreciate the many variations possible in this example, for instance the transmitter may be a broadcast transmitter operable to transmit at a certain rate independent of the receiver reception rate. In such an instance, the receiver may be configured (manually or automatically) to switch to a wider or narrow reception bandwidth, depending upon adjacent channel signal conditions.

The communication system may employ time division duplexing (TDD), frequency division duplexing (FDD), or a combination of these two modes. When operated in a TDD mode, the front-end and back-end switches are selected to have fast switching speeds, preferably in the micro-second region or faster, to permit the shortest possible transition time between successive transmit and receive periods. When operated in a FDD mode, the frequency sources are preferably frequency variable and exhibit settling times in the range of micro-seconds of faster. In a hybrid TDD/FDD system, both the switches and the frequency sources are preferably chosen to have fast switching speeds and settling times, respectively.

In a specific implementation of the present invention, a communication link is established between two transceivers employing the multi-filtering system as described herein. Within each transceiver, the front and back-end switches are double-pole, double-throw field-effect transistor (FET) switches and the switch controller circuitry comprises a digital circuit, each of which are monolithically formed on an integrated circuit chip using bipolar complementary metal oxide semiconductor (Bi-CMOS) Silicon-Germanium (SiGe) processing techniques. The front and back-end switches are configured to operate over the 300 MHz–600 MHz frequency ranges. For TDD systems, switching speeds for the front and back-end switches are preferably in the micro-second or faster range. The two filters comprise externally-located SAW bandpass filters each having different 3 dB bandwidths, said filters of nominal 3 dB bandwidth values of 5 MHz to 10 MHz.

Transceiver front-end receive channel components include a low noise amplifier 331, buffer amplifier 334, and gilbert cell doubly balanced mixer 332 fabricated using a Bi-CMOS SiGe semiconductor process. The front-end frequency source 333 comprises a tunable frequency synthesizer. Front-end transmit channel components includes a buffer amplifier 335 and gilbert cell doubly balanced mixer 336 which are monolithically formed using the aforementioned Bi-CMOS SiGe processing techniques. Frequency source 333 is a frequency synthesizer and is shared between the receive and transmit channels. In an alternative embodiment, e.g., a non-frequency division duplexed TDD system, the frequency source may comprise a fixed frequency source. The power amplifier 337 comprises a discrete pseudo-morphic high electron mobility transistor (PHEMT) amplifier having linearizer or predistortion circuitry for improving power efficiency and linearity.

Receive channel components in the transceiver back-end 340 include a buffer amplifier 341, back-end frequency source 343 and gilbert cell mixer 342 operable to downconvert the filter first IF signal 375 to a second IF or baseband signal 376. In a particular embodiment, the buffer amplifier, synthesizer, and mixer are monolithically formed using the aforementioned semiconductor processing techniques. Transmit channel components in the transceiver back-end include a gilbert cell mixer 344 and buffer amplifier 345 (both fabricated using the aforementioned semiconductor processing), with back-end frequency source 343 comprising a tunable synthesizer which is shared between the receive and transmit channels. As noted above, the frequency synthesizer may be replaced with a fixed frequency source in other embodiments under the present invention.

The foregoing description has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multi-channel filtering system for use in a transceiver having a receive channel and a transmit channel, the multi-channel filtering system comprising:

a front-end multi-pole, multi-throw switch, comprising:

a front-end receive pole configured to couple to the receive channel at a first location thereof;
a front-end transmit pole configured to couple to the transmit channel at a first location thereof; and
a plurality of front-end throws, wherein the front-end receive pole is switchably coupled to one of the plurality of front-end throws, and wherein the front-end transmit pole is switchably coupled to one of the plurality of front-end throws;
a back-end multi-pole, multi-throw switch, comprising:
a back-end receive pole configured to couple to the receive channel at a second location thereof;
a back-end transmit pole configured to couple to the transmit channel at a second location thereof; and
a plurality of back-end throws, wherein the back-end receive pole is switchably coupled to one of the plurality of back-end throws, and wherein the back-end transmit pole is switchably coupled to one of the plurality of back-end throws; and
a plurality of filters interposed between the front-end and back-end multi-pole, multi-throw switches, each of the plurality of filters having a first port coupled to one of the plurality of front-end throws and a second port coupled to one of the plurality of back-end throws.

2. The multi-channel filtering system of claim 1, wherein each of the front-end and back-end multi-pole, multi-throw switches comprises a two-pole, multi-throw switch.

3. The multi-channel filtering system of claim 1, wherein two or more of the plurality of filters comprise filters of different bandwidths.

4. The multi-channel filtering system of claim 3, wherein at least one of the plurality of filters comprises a bandpass filter.

5. The multi-channel filtering system of claim 2, wherein each of the front-end and back-end multi-pole, multi-throw switches comprises two throws.

6. The multi-channel filtering system of claim 1, wherein each of the front-end and back-end multi-pole, multi-throw switches comprises a control signal input for receiving a switch signal operable to select which pole is coupled to which throw.

7. The multi-channel filtering system of claim 1, further comprising a switch controller having an input, a first output coupled to an input of the front-end multi-pole, multi-throw switch, and a second output coupled to an input of the back-end multi-pole, multi-throw switch,
the switch controller operable to receive a switch command, and to output, in response, a first switch control signal to the input of the front-end multi-pole, multi-throw switch, and a second switch control signal to the input of the back-end multi-pole, multi-throw switch,
the switch controller operable to synchronously control states of the front-end and back-end multi-pole, multi-throw switches so that respective throws of the front-end and back-end multi-pole, multi-throw switches are coupled to one of the plurality of filters to complete either the receive channel between the front-end receive pole and the back-end receive pole or the transmit channel between the front-end transmit pole and the back-end transmit pole.

8. The multi-channel filtering system of claim 7, wherein the front-end and back-end multi-pole, multi-throw switches comprise FET switches.

9. The multi-channel filtering system of claim 7, wherein the front-end and back-end multi-pole, multi-throw switches and the switch controller are fabricated using photolithographic semiconductor processing techniques.

10. A transceiver having a transmit channel and a receive channel, the transceiver comprising:
a transceiver front-end, comprising:
a receive channel frequency converter having a first input for receiving a communication signal, a second input for receiving a reference signal, an output for providing a second receive signal comprising a frequency-translated version of the received communication signal; and
a transmit channel frequency converter having a first input for receiving a second transmit signal, a second input for receiving a reference signal, and an output for providing a carrier frequency signal comprising a frequency-translated version of the second transmit signal; and
a multi-channel filtering system coupled to the receive channel frequency converter and the transmit channel frequency converter, the multi-channel filtering system comprising:
a front-end multi-pole, multi-throw switch, comprising:
a front-end receive pole coupled to the output of the receive channel frequency converter;
a front-end transmit pole coupled to the first input of the transmit channel frequency converter; and
a plurality of front-end throws, wherein the front-end receive pole is switchably coupled to one of the plurality of front-end throws, and wherein the front-end transmit pole is switchably coupled to one of the plurality of front-end throws;
a back-end multi-pole, multi-throw switch, comprising:
a back-end receive pole coupled to the receive channel at a first location;
a back-end transmit pole coupled to the transmit channel at a second location; and
a plurality of back-end throws, wherein the back-end receive pole is switchably coupled to one of the plurality of back-end throws, and wherein the back-end transmit pole is switchably coupled to one of the plurality of back-end throws; and
a plurality of filters interposed between the front-end and back-end multi-pole, multi-throw switches, each of the plurality of filters having a first port coupled to one of the plurality of front-end throws and a second port coupled to one of the plurality of back-end throws.

11. The transceiver of claim 10, wherein the receive channel frequency converter and the transmit channel frequency converter are coupled to a common frequency source.

12. The transceiver of claim 11, wherein the common frequency source is frequency variable.

13. The transceiver of claim 10, wherein the common frequency source is a fixed frequency source.

14. The transceiver of claim 10, wherein the receive channel frequency converter comprises a downconverter circuit, and the transmit channel frequency converter comprises an upconverter circuit.

15. The transceiver of claim 10, further comprising a transceiver back-end, the transceiver back-end comprising:
a receive channel second frequency converter coupled to the receive channel, having a first input for receiving a third receive signal, a second input for receiving a reference signal, an output for providing a fourth receive signal comprising a frequency-translated version of the third receive signal; and
a transmit channel second frequency converter coupled to the transmit channel, having a first input for receiving a first transmit signal, a second input for receiving a reference signal, and an output for providing a third transmit signal comprising a frequency-translated version of the first transmit signal.

16. The transceiver of claim 15, wherein the receive channel second frequency converter comprises a downconverter circuit, and the transmit channel second frequency converter comprises an upconverter circuit.

17. The transceiver of claim 10, wherein the front-end and back-end multi-pole, multi-throw switches comprise two-pole, multi-throw switches.

18. The transceiver of claim 10, wherein two or more of the plurality of filters comprise filters of different bandwidths.

19. The transceiver of claim 18, wherein the filters of different bandwidths are switchably selectable from one to another of the filters during signal reception or signal transmission.

20. The transceiver of claim 10, wherein each of the plurality of filters comprises a bandpass filter.

* * * * *

UNITED STATES PATENT AND TRADEMARK OFFICE
CERTIFICATE OF CORRECTION

PATENT NO. : 7,155,193 B2 Page 1 of 1
APPLICATION NO. : 10/806682
DATED : December 26, 2006
INVENTOR(S) : Rowe et al.

It is certified that error appears in the above-identified patent and that said Letters Patent is hereby corrected as shown below:

On the Title page, in item (75) Inventors: Replace "Matthew D Pope" with -- Matthew D. Pope --.

Column 3, line 26, replace "coupled" with -- couple --.

Column 6, line 32, replace "(PHEMT)" with -- (pHEMT) --.

The claims, claim 13, column 8, line 52, replace "The transceiver of claim 10," with -- The transceiver of claim 11, --.

Signed and Sealed this

Sixth Day of May, 2008

JON W. DUDAS
*Director of the United States Patent and Trademark Office*